Nov. 28, 1967

A. H. DU ROSE 3,355,267

CORROSION RESISTANT COATED ARTICLES
AND PROCESSES OF PRODUCTION THEREOF

Filed Feb. 12, 1964

ARTHUR H. DU ROSE  INVENTOR.

BY *Robert X. Mihalek*

ATTORNEY

United States Patent Office 3,355,267
Patented Nov. 28, 1967

3,355,267
CORROSION RESISTANT COATED ARTICLES AND PROCESSES OF PRODUCTION THEREOF
Arthur H. Du Rose, Euclid, Ohio, assignor, by mesne assignments, to Kewanee Oil Company, Bryn Mawr, Pa., a corporation of Delaware
Filed Feb. 12, 1964, Ser. No. 344,474
19 Claims. (Cl. 29—194)

ABSTRACT OF THE DISCLOSURE

A laminated product and the process of preparation comprising a composite coating of three firmly bonded layers of nickel bonded to a nickel substrate, the intermediate nickel layer being a nickel-phosphorus alloy sandwiched between and in adherent contact with a phosphorus-free layer of nickel on each side of said intermediate layer. The method of preparing such said product comprises the steps of depositing a first nickel layer on a metal surface susceptible to atmospheric corrosion, then electrodepositing a second layer from an aqueous solution of salt and free acids capable of permitting a codeposition of phosphorus with nickel to form a layer of nickel having a thickness of about 0.01–0.2 mil and having a phosphorus content of about 0.4–10% by weight of the intermediate layer, and thereafter depositing a layer of phosphorus-free nickel on said nickel-phosphorus alloy layer.

---

This invention relates to a composite coating of three adjacently bonded layers of nickel and more particularly this invention relates to such a composite coating wherein the intermediate layer thereof comprises a thin nickel deposit containing a desired amount of phosphorus.

In accordance with the present invention there is provided an improved composite coating comprising three adjacently bonded layers of nickel deposits, the lower layer of a conventional low-sulfur nickel electroplate preferably 0.3 to 2 mils thick and having from 0 to about 25 percent cobalt by weight alloyed therewith and a sulfur content preferably less than 0.1 percent, a top layer of a conventional bright nickel electroplate preferably 0.15 to 1 mil thick and having from 0 to 50 percent cobalt alloyed therewith and preferably from about 0.03 percent to about 0.3 percent sulfur by weight; and characterizing the invention, an intermediate layer 0.01 to 0.2 mil thick of which comprises a deposit of nickel having from about 0 to about 25 percent cobalt alloyed therewith and containing from about 0.4 percent phosphorus to about 10.0 percent phosphorus based on the total weight of said deposit.

In recent years much work has been done to provide an article with a decorative plate of chromium over two or three underlying layers of nickel. The composition and electrochemical properties of these layers of nickel are balanced to obtain good protection of the base surface against corrosion without compromising the decorative appearance. To be effective the series of nickel layers must be deposited from plating baths adapted to impart not only the desired electrochemical properties to the nickel layers but also the other physical and chemical properties necessary for a good plate. Moreover, the brightness and other surface characteristics of the top layer must be such that the chromium deposit be smooth, lustrous and substantially free from color, spots and the like.

When using three layers of nickel, the composition of the intermediate layer is adjusted so as to be anodic to both the upper and lower layers and preferably the composition of the upper layer is adjusted so as to be anodic to the lower layer. The decorative chromium layer is more noble than the other nickel layers. Moreover, the intermediate layer advantageously is made very thin, the reasons for which will be explained more fully hereinafter.

The advantages of using a triple-layer system to protect a corrodable substrate over a two-layer system becomes significant when the mechanism by which each layer is considered to protect the substrate is understood.

The advancement of a corrosion pit in a triple-layer system prepared according to the present invention is illustrated in the accompanying drawing in which.

Figure 1:
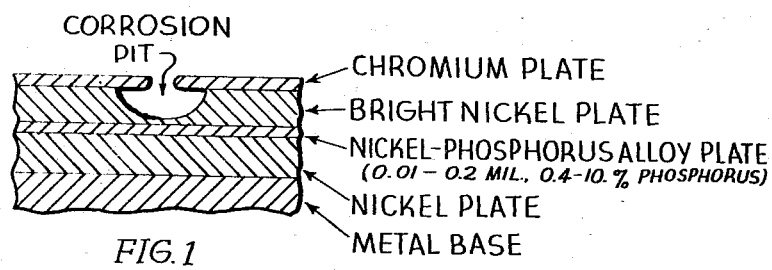
FIG. 1 illustrates schematically a triple-layer system with a corrosion pit in its incipient stage.
Figure 2:
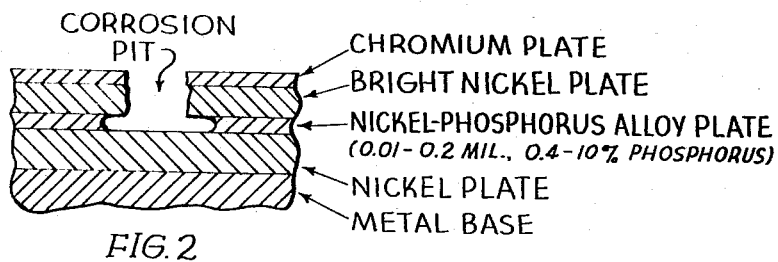
FIG. 2 illustrates the same triple-layer system with the corrosion pit in an advanced stage where the pit has reached and has attacked the intermediate layer.
Figure 3:
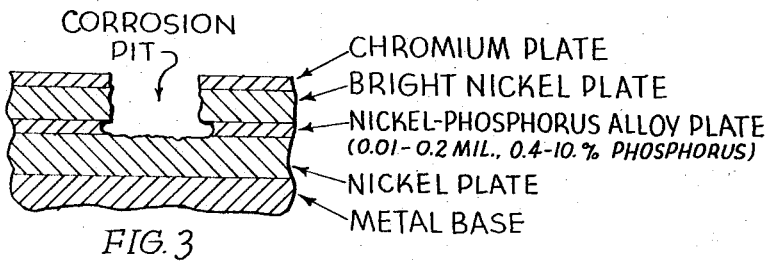
FIG. 3 illustrates the same triple-layer system with the corrosion pit widened laterally but the lower layer has not been attacked substantially.

Referring to FIGS. 1–3 of the drawing, there is illustrated in sequence the progressive corrosion of a typical three-layer composite. As a corrosion pit is formed in the top nickel layer as shown in FIG. 1 (usually through a pore or other defect in the chromium decorative coat), the pit progressively enlarges hemispherically. This corrosion site continually enlarges until it reaches the more anodic intermediate layer.

In FIG. 2 the corrosion pit has attacked the intermediate layer, progressed until the pit has become substantially cylindrical rather than hemispherical and has undercut the intermediate layer slightly below the top layer of nickel. Because the lower layer is more noble than the two upper layers of nickel, the lower layer remains relatively free from corrosion.

As the intermediate layer corrodes beneath the top or upper layer, the intermediate layer becomes more inaccessible to the corroding electrolyte and the total polarization increases due to localized changes in concentration causing increase in the resistance of the electrolyte and other ohmic effects. Thus the rate of the corrosion of the intermediate layer decreases and the top layer begins to corrode again and exposes the intermediate layer renewing the anodic protection of the top layer. This cycle continually is repeated while the lower layer is protected by the sacrificial action of both the intermediate layer and the top layer. In FIG. 3 there is shown a plate with the corrosion pit widened with the lower layer of nickel being attacked only very slightly. The rate of corrosion of the lower layer in relation to the top and intermediate layer is usually less than 1 to 100.

In the triple-layer system the intermediate layer acts as the sacrificial anode primarily, while the top layer provides the bright surface for the decorative chromium; the composition of the intermediate layer need not be controlled as rigidly as the composition of the top layer in a duplex system.

Originally, the triple-layer systems were made using as the intermediate layer metals usually different from nickel but anodic thereto. With the use of some systems, marked corrosion resistance was observed (see Knapp, Trans. Inst. Met. Finishing, 1958, 35 139–165). In most cases, however, the systems were found not to be useful, either because the metal corroded too rapidly causing blistering or scaling or because the metal stained or colored the decorative surface.

Within the last few years triple-layer systems have been made using a nickel-containing deposit for each layer and wherein relative potentials of the layers are controlled by the amounts of sulfur deposited with the nickel. The sulfur may be controlled in the bath by adjusting the contents of the various organic brightening additives comprising sulfur with or without additional sulfur-containing compounds. Sulfur-free brighteners with sulfo-oxygen carriers also may be used to enhance the sulfur in the nickel deposit. This control of the addition agents ultimately controls the amount of sulfur in the electrodeposits and thereby the relative potential which is the important factor.

Several problems have confronted the industry in accepting the triple-layer system because sulfur as such not only provides differences in potential in electrodeposits of nickel but also affects other physical properties such as ductility and brightness and continuity of the deposit. For instance, if the proper potential is to be maintained between the intermediate layer and the top layer, the sulfur contents of each layer must be controlled. However, there is evidence that the electronegative potential (its relative susceptibility to corrosion) of sulfur-containing nickel does not vary as a straight line function in relation to the sulfur content and tends to level off at sulfur concentrations in the range of from about 0.2–0.3 percent by weight. Thus it is seen that the degree in which the concentration of sulfur may be varied in the nickel layer to adjust potential is very narrow. Moreover, if a manufacturer prefers to deposit a lower layer of nickel from a sulfur-containing bath, he necessarily will have to increase the amounts of sulfur in the intermediate and upper nickel layers necessitating the adjustment of the other additives in the bath.

As indicated hereinbefore the triple-layer composite coating of the present invention is characterized by an intermediate layer of nickel-containing from about 0.4 percent to about 10 percent phosphorus by weight based on the total weight of the nickel layer. Preferably the phosphorus content is maintained between about 0.6 and 6 percent by weight. It has been discovered that the systems of the present invention are not only more durable than the systems using sulfur in the intermediate layer but they are more easily and advantageously prepared; they may be deposited merely from a standard bath having the proper concentration of a water-soluble phosphorus compound. Moreover the phosphorus compounds are more stable in the bath than the sulfur compounds which may be used in the bath to impart sulfur into the deposit especially in regard to air oxidation.

Another significant advantage in using phosphorus as the alloying constituent to control the relative potential of the intermediate layer is that phosphorus can be used within a relatively wide range of concentration. It has been found that nickel deposits containing phosphorus in amounts within the above-indicated preferred range do not vary in potential much more than about 150 millivolts. Sulfur, when used in the plate in amounts greater than 0.2 to 0.3 percent is detrimental to the physical properties such as ductility and brightness and also does not provide significant increases in potential. It is readily seen that a small difference in sulfur content makes a larger difference in potential than a similar difference in phosphorus content.

As mentioned hereinbefore the purpose of the intermediate layer is to provide resistance to corrosion of the lower layer and to a lesser extent, the upper layer. As stated, the mechanism by which this protection occurs is through internal battery action; the anodic intermediate layer acts as a sacrificial anode.

Therefore a good criterion for effectiveness of the intermediate layer is the relative open circuit potential of this deposit compared to that of the top and bottom deposits. The potential of the intermediate layer should be more anodic (electronegative) than either of the other layers.

In the last analysis, the better criteria useful in preparing the triple-layer composites of the present invention are the relative potentials of the layers rather than the concentrations of the alloying constituent. Many times the alloying constituent is occluded in the deposit which gives erratic results when trying to correlate the concentration of the alloying constituent with the relative potentials and corrosion resistance.

The open circuit potential of S-containing deposits is roughly proportional to the log of the S content, rising very rapidly with the first small increments of S and rising less rapidly after about .1 percent S has been introduced. The potential of an S-free deposit is about —80 mv., of .05 percent S about —150 mv., of .1 percent S about —170 mv., of .2 percent S about —187 mv., of .3 percent S about —200 mv., and of 4.5 percent S about —350 mv. Using benzene or dichlorobenzene sulfinic acids which are the most practical compounds for introducing higher S contents, the maximum percent sulfur that can be obtained is about .3 percent.

Higher electronegative potentials can be obtained by introducing phosphorus, probably as the phosphide, into nickel. Unlike S, however, the potential of the P-containing deposits reach a maximum and then decrease with increasing P contents. The open circuit potential at .4 percent P is about —230 mv., at .6 percent P about —260 mv., at 1.5 percent P about —360 mv., at 4 percent P about —420 mv., at 6 percent P about —380 mv. and at 9 percent P the potential is back down to about —140 mv. In the preferred range of P content, open circuit potentials are of the order of —250 to —450 mv.

In the composite deposit it is desirable that the intermediate P-containing deposit be about 60 mv., or preferably more, anodic to the bottom layer. The potential of the intermediate layer should at least equal and preferably be more electronegative than the top nickel deposit. Some advantage or benefit is obtained even when the potential of the upper layer approaches the potential of the intermediate layer.

In addition to phosphorus, the intermediate layer may include minor amounts of other materials such as sulfur, selenium, tellurium, arsenic, and the like.

Corrodkoke is the name given to an accelerated test in which a synthetic road soil slurry is applied to the plated surface of an article and the article is then exposed to a warm humid atmosphere. A Corrodkote slurry formulation includes both soluble and insoluble elements and sufficient liquid to give spreading consistency. The slurry is applied to the surface being tested by means of a paint brush, or similar device, to produce a fairly uniform coating, after which the coated specimen is exposed to specified humidity conditions. A standard Corrodkote mixture effective in testing chromium-nickel combinations over steel, is:

| | | |
|---|---|---|
| Kaolin | grams | 30 |
| Ferric chloride | do | 0.165 |
| Cupric nitrate | do | 0.035 |
| Ammonium chloride | do | 1 |
| Water | ml | 50 |

The CASS test involves exposing the plated parts to a salt spray containing small concentrations of cupric chloride and acetic acid.

Both the Corrodkote and the CASS tests have been accepted by the industry as well established accelerated tests for corrosion. For a complete description of the tests see "Plating," vol. 44, p. 763, 1957.

In some instances neither the Corrodkote test nor the CASS test are absolutely reliable in predicting service life of plated parts on cars. Where some plated panels were rated good by the Corrodkote test, the same panels were rated poor by the CASS test and the reverse would be observed with other plated panels. Therefore the test results set forth hereinafter to show the advantages of the present invention were obtained by submitting the sample panels to 3 or 4 Corrodkote cycles; instead of using more Corrodkote cycles, following with the CASS test. Controls or panels for comparison were always employed. A representative test would be 3 to 4 Corrodkote cycles plus 48 hours of CASS exposure.

The composite electroplate of the present invention is advantageously employed over various substrates and particularly substrates susceptible to corrosion. Iron, steel, copper, brass and aluminum, zinc and magnesium with a copper strike, are substrates advantageously protected by the composite electroplates of the present invention.

In order to carry the present invention into effect, the substrate is plated first with a lower layer of nickel and then with the intermediate layer of nickel and the upper layer of nickel. Any solution of nickel ions designed for electroplating nickel may be used. Moreover, the phosphorus-containing intermediate layer may be deposited from a bath designed for electroless plating of nickel using hypophosphites.

The solutions contain at least one of the following salts: nickel sulfate, nickel chloride, nickel fluoborate and nickel sulfamate, wherein the solution is adjusted to an operating concentration of nickel. Included among the various baths useful in carrying out the present invention are (1) the various barrel plating baths generally comprising nickel sulfate and nickel chloride as the source of the nickel ion and buffer systems comprising boric acid alone or in conjunction with magnesium sulfate or ammonium chloride, (2) the all-chloride bath designed for use where a high current density is desired, comprising nickel chloride as the source of nickel ion and boric acid as the buffer, (3) the fluoborate bath comprising nickel fluoborate as the source of nickel ion and free boric acid as the buffer alone or in combination with fluoboric acid, (4) the common Watts-type bath designed for all purpose nickel plating and generally comprising nickel sulfate and nickel chloride as the source of nickel ion buffered with boric acid, (5) the all sulfamate bath comprising nickel sulfamate including boric acid as the buffer, and (6) the chloride-sulfamate bath comprising nickel chloride and nickel sulfamate with boric acid as the buffer.

After the desired thickness is obtained for the first or lower layer of nickel, the phosphorus-containing intermediate layer of nickel is deposited. A phosphorus-supplying compound is added thereto, the bath is adjusted to the appropriate concentration and a thin layer of phosphorus-containing nickel is deposited directly on the surface of the first or lower layer of nickel.

The composite is then completed by plating a third deposit of nickel directly on the surface of the intermediate plate. Preferably this plate is fully bright to provide an optimum surface for the decorative chromium plate. Each of the above layers of nickel may be deposited using more than one step such as for example by interrupting the plating cycle for one reason or another.

In some cases it may be desirable to electroplate the top layer of nickel with a chromium deposit having a thickness ranging from about 0.005 to 0.2 mil.

In its preferred form the composite coating of the present invention comprises a first or lower layer of ductile sulfur-free nickel. This preferred plate is deposited from a typical Watts-type or fluoborate-type bath containing an effective amount of a sulfur-free leveler such as coumarin and the like. The top layer of nickel preferably being fully bright is deposited from one of the above baths using a brightener of the first class (sulfo-oxygen carrier) and a brightener of the second class. Where the top layer is high in sulfur content (0.1 to 0.3 percent) the lower layer also may be deposited from a bath containing in addition to a brightener of the first class (sulfo-oxygen compound) small amounts of a brightener of the second class. The baths disclosed in U.S. Patent 3,090,733 as being useful for preparing the upper layers of nickel in the composite disclosed and claimed therein may be used to deposit the upper layers of nickel for the present invention.

As indicated hereinbefore, the lower and top layers of nickel may be deposited from baths of conventional compositions and in the baths there may be present one or more brighteners of the first class. These compounds generally comprise an aryl ring, a substituted aryl ring or an unsaturated aliphatic chain with a sulfur-containing radical in the form of sulfonic acids, sulfonates, sulfonamides, sulfimides, sulfinic acid and sulfones. The aryl ring advantageously may be derived from benzene, naphthalene and the like, the substituted aryl ring may be derived from toluene, xylene, naphthylamine, toluidine, benzyl naphthalene and the like and the alkylene chain may advantageously be derived from vinyl compounds or allyl compounds and the like. Examples of sulfo-oxygen compounds of the above described type and which are useful particularly in the instant nickel plating baths are found in U.S. Patents 2,757,133 and 2,766,284.

Almost uniformly, the top layer of nickel is deposited from baths containing, in addition to brighteners of the first class, brighteners of the second class including organic compounds dependent on the carbonyl ($>$C$=$O) radical for the brightening action such as the various ketones, aldehydes, carboxylic acids, some proteins (gelatin) and the like; those compounds dependent on the ethylenic (—CH$=$CH—) radical for the brightening action such as the alkylenic carboxylic esters, the alkylenic aldehydes, the aromatic compounds dependent on the in-ring ethylenic radical such as the aryl aldehydes, the sulfonated aryl aldehydes, allyl and vinyl substituted compounds, coumarin and its derivatives, and the like; those compounds dependent on the acetylenic radical (—C$\equiv$C—) including the acetylenic alcohols, nitrogen heterocyclics having an N-substituted acetylenic radical and the like; those compounds depending on the azo and azine type nuclei ($>$C$=$N— and —N$=$N—) for the brightening action such as the azine, thiazane and oxazine dyes, the triphenyl methane dyes, the quinidines, pyrimidines, pyrazoles and imidazoles, the pyridinium and quinolinium compounds, and the like; those compounds dependent on the cyano radical for the brightening action such as the nitriles, thionitriles and the like; and those compounds dependent on the thioureide radical

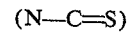

(N—C$=$S)

such as the cyclic thioureides and thiourea.

Compounds considered useful as brighteners of the second class include the water-soluble acetylenic compounds set forth in U.S. Patent (Kardos et al.) 2,712,522; the aryl, alkylene and arylalkynoxy sulfonic acids set forth in U.S. Patent 2,800,442; the alkynoxy sulfonic and carboxylic acids having the triple bond separated from the acid radical by at least one oxygen atom set forth in U.S. Patent 2,841,602; the nitriles set forth in U.S. Patents 2,524,010, 2,647,866, 2,882,208, 2,978,391 and 3,093,557.

Where cobalt is desired as an alloying constituent in the nickel layers, the instant baths may be adjusted by adding any of the cobalt salts well known to those skilled in the art. For examples, the halides of cobalt are particularly useful cobalt chloride, cobalt bromide, and the like. Cobalt sulfate may be used, also.

Nickel electroplating baths particularly useful in combination with these brightener systems include the Watts-type and fluoborate-type baths having increased nickel content. Such baths are designed for use with organic brighteners in general; they may be operated at the higher current densities desirable for the effective use of the organic brighteners. The preferred Watts-type bath essentially comprises an overall nickel content ranging from 70 to 115 grams per liter provided by 270 grams per liter to about 450 grams per liter of nickel sulfate and from about 20 grams per liter to about 90 grams per liter of nickel chloride with about 30 to 40 grams per liter of boric acid as the buffer and the preferred fluoroborate-type bath essentially comprises an over-all nickel content ranging from 75 to 110 grams per liter provided by about 440 grams per liter of nickel fluoborate with about 30 grams per liter of boric acid as the buffer.

For purposes of the present invention, boric acid is preferred as the buffer as an additive to maintain the desired pH. However, acetic acid, borax (sodium tetraborate), formic acid, the fluoroborates, and other compounds commonly known to have utility as buffers, may be used with the baths of the present invention with no apparent undesirable effects.

Illustrative examples of wetting agents which may be employed in the baths for carrying out the present invention include a great majority of the anionic surfactants. The sulfate type particularly may be used. Included among this type are certain of the alkylsulfates, aralkylsulfates, alkylsulfonates, and the aralkylsulfonates.

The use of a wetting agent in baths used in carrying out the present invention is optional; excellent deposits are obtained from baths having no wetting agent provided they are free of water-insoluble and hydrophobic matter.

The following Table A sets forth specific compositions of baths useful for depositing the lower layer in preparing the triple-layer composite electroplate of the present invention:

phorus into the nickel deposit are not very soluble in water which therefore restricts or limits the amounts which can be used.

Preferably, the operating temperature of a typical bath (Watts type) is in the range of from about 130° F. to about 150° F. This range is not critical; however, good deposits may be obtained at temperatures as low as 50° F. or lower and at temperatures as high as 180° F. or even at the boiling point of the electrolyte. The phosphorus compounds particularly useful are those which are capable of supplying phosphorus in a form which permits codeposition of phosphorus with the nickel.

For purposes of the present invention the phosphorus compounds which may be used effectively in forming the phosphorus-containing intermediate layers may be defined by the general formula (I) 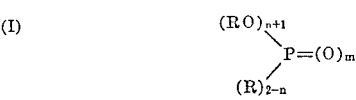

TABLE A

| Bath | Nickel Salts, g./l. | Addition Agent, g./l. | Other Additives, g./l. | Wetting Agents, g./l. | Boric Acid Buffer, g./l. | pH |
|---|---|---|---|---|---|---|
| 1a | NiSO$_4$·6H$_2$O, 300; NiCl$_2$·6H$_2$O, 37 | | | Sodium lauryl sulfate, 0.02 | 37 | 3.5 |
| 2a | NiSO$_4$·6H$_2$O, 300; NiCl$_2$·6H$_2$O, 37 | Coumarin, 0.2 | Formaldehyde (40%), 0.1 cc./l; Chloral, 0.2 | do | 37 | 4.0 |
| 3a | NiSO$_4$·6H$_2$O, 300; NiCl$_2$·6H$_2$O, 45 | Nickel Formate, 4.5 | Formaldehyde, 0.5 cc./l | do | 30 | 2.5 |
| 4a | NiSO$_4$·6H$_2$O, 150; NiCl$_2$·6H$_2$O, 150; CoSO$_4$·6H$_2$O, 30 | 3-bromocoumarin, 0.2 | | | 30 | 4.0 |
| 5a | NiSO$_4$·6H$_2$O, 300; NiCl$_2$·6H$_2$O, 30 | Butynediol, 0.3 | Chloral, 0.05 | | 30 | 4.0 |
| 6a | NiSO$_4$·6H$_2$O, 300; NiCl$_2$·6H$_2$O, 30 | Coumarin, 0.1 | Formaldehyde (10%) 0.1 cc./l; Saccharin, 1.0 | Na octyl sulfate, .1 | 35 | 4.0 |
| 7a | Ni(BF$_4$)$_2$, 300; NiCl$_2$·6H$_2$O, 30 | Coumarin, 0.2 | Chloral, 0.05 | do | 35 | 3.5 |

The following Table B sets forth specific compositions of baths which may be used for depositing a top layer in a preparation of the triplex composite electroplate of the present invention:

wherein $n$ is an integer from 0–1 inclusive, $m$ is an integer from 0–1 inclusive and R represents hydrogen, an alkali metal, nickel, cobalt, or an alkyl, aralkyl, aryl or alkaryl

TABLE B

| Ex. No. | Nickel Salts, g./l. | Organic Sulfo-oxygen cpd., g./l. | Brighteners, g./l. | Wetting Agents, g./l. | Boric Acid Buffer, g./l. | pH |
|---|---|---|---|---|---|---|
| 1b | NiSO$_4$·6H$_2$O, 300; NiCl$_2$·6H$_2$O, 37 | Naphthalenedisulfonic acid, 4 | Reduced fuchsin, .007 | Sodium lauryl sulfate, 0.03 | 37 | 3.5 |
| 2b | NiSO$_4$·6H$_2$O, 300; NiCl$_2$·6H$_2$O, 37 | Saccharin, 1; Allyl sulfonate, 0.5 | Butynediol, 0.2; Coumarin, 0.1 | do | 37 | 4.0 |
| 3b | NiSO$_4$·6H$_2$O, 300; NiCl$_2$·6H$_2$O, 37 | Dibenzenesulfonimide, 3 | Allylpyridinium bromide, 0.05 | do | 37 | 4.0 |
| 4b | NiSO$_4$·6H$_2$O, 300; NiCl$_2$·6H$_2$O, 37 | p,p', Oxy-bis(dibenzene sulfonamide), 3 | B,B', thiodipropionitrile, 0.003 | Sodium octyl sulfate, 0.1 | 37 | 4.0 |
| 5b | NiSO$_4$·6H$_2$O, 150; NiCl$_2$·6H$_2$O, 150 | Saccharin, 2; Allyl sulfonate, 1 | do | do | 37 | 3.5 |
| 6b | Ni(NH$_2$)SO$_4$]$_2$, 400; NiCl$_2$·6H$_2$O, 15 | Same as 2b | Same as 2b | Same as 1b | 37 | 4.0 |
| 7b | NiSO$_4$·6H$_2$O, 300; NiCl$_2$·6H$_2$O, 40 | Benzenesulfonamide, 2 | | Same as 1b | 37 | 3.5 |

The preparation of the phosphorus-nickel plating baths advantageously is carried out merely by adding from about 0.5 gram per liter to about 15 grams per liter and preferably 2 grams per liter to about 8 grams per liter of a phosphorus-supplying compound to any one of the above enumerated baths used for depositing nickel. The amounts of the particular phosphorus-supplying compound necessary to impart a desired amount of phosphorus in the nickel deposit vary with each compound; and, of course, with the temperature of the bath and cathode current density. Moreover many phosphorus-containing compounds which can be used to impart phosphorus radical. Phosphorus acid which is sometimes defined as having the general structure (II) 

is thought by those skilled in the art to exist in aqueous solution with the structure (III) 

(see, for example, Wells, Structural Inorganic Chemistry, 2nd ed. (1950) Oxford Press, N.Y., p. 487).

All of the phosphorus compounds embraced by Formula I include the acids of phosphorus and salts and their esters wherein one or two radicals (hydrogen, a metal or an organic radical) are bonded directly to the phosphorus and wherein at least one hydroxyl radical is bonded directly to the phosphorus. Generally the compounds intended to be embraced by Formula I include phosphorus acid and its derivatives such as the phosphite salts thereof particularly the phosphite esters, alkali metal phosphites, nickel phosphite, cobalt phosphite, and the like; the organic phosphonic acids and esters such as the alkylphosphonic acids, alkynylphosphonic acids, and the like, hypophosphorous acid and the hypophosphite salts particularly the alkali metal hypophosphites such as sodium hypophosphite and the like; the organic phosphinic acids and esters such as the alkylphosphinic acids, arylphosphonic acids, alkylphosphinic acid esters, arylphosphinic acid esters, alkylarylphosphinic acid esters and the like; and the organic phosphonous acids and esters such as the alkylphosphonous acids, aralkylphosphonous acids, arylphosphonous acids, alkarylphosphonous acids, alkylphosphonous acid esters, arylphosphonous acid esters, alkyl- arylphosphonous acid esters and the like; the organic phosphinous acids and esters such as the alkylphosphinous acids, alkenylphosphinous acids, alkynylphosphinous acids, arylphosphinous acids, and alkarylphosphinous acids.

Specific names of particularly useful salts are lithium, sodium, potassium phosphites, nickel phosphite and cobalt phosphite if cobalt may constitute part of the deposit, trimethyl-, triethyl-, triethylene-, tripropyl-, and tripropylenephosphites (the tri-substituted organic phosphite being water insoluble hydrolyze in the bath to provide water-soluble compounds) phenylphosphinic acid, hydroxybenzylphosphinic acid and diphenylphenylphosphinate and lithium, sodium and potassium phosphonates, phenylphosphonic acid, and dibutylpropargylphosphonate.

In order to aid those skilled in the art in formulating nickel phosporus baths for carrying the instant invention into effect, reference is made to U.S. Patents 2,594,933, 2,839,458, and 2,643,221, the disclosures of which are incorporated herein by reference.

The following Table C sets forth specific compositions of baths used for depositing the phosphorus-containing intermediate layer in a preparation of the triplex-composite electroplate of the present invention:

TABLE C

| Bath | Nickel Salts, g./l. | Phosphorus Compounds, g./l. | Other Additional Agents, g./l. | Wetting Agents, g./l. | Boric Acid, | pH | Phosphorus in Deposit, percent |
|---|---|---|---|---|---|---|---|
| 1c | NiSO$_4$.6H$_2$O, 250 / NiCl$_2$.6H$_2$O, 37 | Nickel Phosphite, 2.25 g./l. as H$_3$PO$_3$ | | | 37 | 3 | 0.9 |
| 2c | NiSO$_4$.6H$_2$O, 250 / NiCl$_2$.6H$_2$O, 37 | Sodium Phosphite, 5 g./l. as H$_3$PO$_3$ | | | 37 | 2.5 | 1.6 |
| 3c | NiSO$_4$.6H$_2$O, 250 / NiCl$_2$.6H$_2$O, 37 | Phosphorus Acid, 10.2 | | | 37 | 1.5 | 9.2 |
| 4c | NiSO$_4$.6H$_2$O, 250 / NiCl$_2$.6H$_2$O, 37 | Phosphorus Acid, 6 | Naphthalene disulfonate, 1 / Saccharin, 0.5 | Sodium lauryl sulfate, 0.02 | 37 | 2.0 | 3.0 |
| 5c | NiSO$_4$.6H$_2$O, 250 / NiCl$_2$.6H$_2$O, 37 | Dibutyl propargyl Phosphonate, 2.5 | | | 37 | 3 | 0.9 |
| 6c | NiSO$_4$.6H$_2$O, 250 / NiCl$_2$.6H$_2$O, 37 | Triethyl Phosphite, 1 | | | 37 | 3 | 1.0 |
| 7c | NiSO$_4$.6H$_2$O, 250 / NiCl$_2$.6H$_2$O, 37 | Triethylene Phosphite, 2 | | | 37 | 3 | 1.3 |
| 8c | NiSO$_4$.6H$_2$O, 250 / NiCl$_2$.6H$_2$O, 37 | Benzene Phosphinate, 2 | | | 37 | 3 | 1.1 |
| 9c | Ni[(NH$_2$)SO$_3$]$_2$,* 400 / NiCl$_2$.6H$_2$O, 15 | Phosphorous Acid, 6 | | | 30 | 3 | 2.9 |
| 10c | NiSO$_4$.6H$_2$O, 250 / NiCl$_2$.6H$_2$O, 37 | Sodium hypophosphite, 5 | | | 30 | 4.0 | 3.65 |
| 11c | Electroless Ni / NiCl$_2$.6H$_2$O, 30 / Bath (U.S. 2,643,221) | Sodium hypophosphite, 10 | Sodium citrate, 10 | | | 5.0 | 8.0 |
| 12c | NiSO$_4$.6H$_2$O, 150 / NiCl$_2$.6H$_2$O, 50 | Phosphorous Acid, 40 | | | | 1.5 | 9.6 |
| 13c | NiSO$_4$.6H$_2$O, 250 / NiCl$_2$.6H$_2$O, 37 | Phosphorous Acid, 6 | | Sodium octyl sulfate | 37 | 2.5 | 3.0 |
| 14c | NiSO$_4$.6H$_2$O, 300 / NiCl$_2$.6H$_2$O, 45 | Dibutylpropargylphosphonate, .5 | | Sodium lauryl sulfate, 0.02 | 41 | 4.0 | <.05 |
| 15c | NiSO$_4$.6H$_2$O, 300 / NiCl$_2$.6H$_2$O, 45 | Dibutylpropargylphosphonate, 2.5 | | do | 41 | 4.0 | .09 |
| 16c | NiSO$_4$.6H$_2$O, 300 / NiCl$_2$.6H$_2$O, 45 | Benzenephosphonous acid, 1.0 | | do | 41 | 4.0 | 0.63 |
| 17c | NiSO$_4$.6H$_2$O, 300 / NiCl$_2$.6H$_2$O, 45 | Benzenephosphonic acid, 1.0 | | do | 41 | 4.0 | <.05 |
| 18c | NiSO$_4$.6H$_2$O, 300 / NiCl$_2$.6H$_2$O, 45 | Hexamethylphosphoramide, 1.0 | | do | 41 | 4.0 | <.05 |
| 19c | NiSO$_4$.6H$_2$O, 300 / NiCl$_2$.6H$_2$O, 45 | Diphenylphenylphosphinate, 1.0 | | do | 41 | 4.0 | 0.49 |
| 20c | NiSO$_4$.6H$_2$O, 300 / NiCl$_2$.6H$_2$O, 45 | Triethylphosphite, 1.0 | | do | 41 | 4.0 | 0.99 |
| 21c | NiSO$_4$.6H$_2$O, 300 / NiCl$_2$.6H$_2$O, 45 | Triethylenephosphite, 1.0 | | do | 41 | 4.0 | 0.65 |
| 22c | NiSO$_4$.6H$_2$O, 300 / NiCl$_2$.6H$_2$O, 45 | Benzenephosphinic Acid, 1.0 | | do | 41 | 4.0 | 0.72 |
| 23c | NiSO$_4$.6H$_2$O, 300 / NiCl$_2$.6H$_2$O, 45 | Benzenephosphinic Acid, 2.0 | | do | 41 | 4.0 | 1.1 |
| 24c | NiSO$_4$.6H$_2$O, 300 / NiCl$_2$.6H$_2$O, 45 | Allylphosphonic Acid, 1.0 | | do | 41 | 4.0 | <.05 |
| 25c | NiSO$_4$.6H$_2$O, 300 / NiCl$_2$.6H$_2$O, 45 | Allylphosphonic acid, 5.0 | | do | 41 | 4.0 | <.05 |
| 26c | NiSO$_4$.6H$_2$O, 300 / NiCl$_2$.6H$_2$O, 45 | Sodium Hypophosphite, 5.0 | | do | 41 | 4.0 | 3.65 |
| 27c | NiSO$_4$.6H$_2$O, 300 / NiCl$_2$.6H$_2$O, 45 | Diallylallylphosphonate, 0.75 | | do | 41 | 4.0 | 0.02 |
| 28c | NiSO$_4$.6H$_2$O, 300 / NiCl$_2$.6H$_2$O, 45 | Phosphorous Acid, 39.8 | Phosphoric Acid, 50.3 | | | 1.5 | 9.6 |
| 29c | NiSO$_4$.6H$_2$O, 300 / NiCl$_2$.6H$_2$O, 45 | Phosphorous acid, 2.5 | | Sodium lauryl sulfate, 0.02 | 41 | 2.5 | 0.85 |
| 30c | NiSO$_4$.6H$_2$O, 300 / NiCl$_2$.6H$_2$O, 45 | Phosphorous Acid, 4.4 | | do | 41 | 2.5 | 1.59 |
| 31c | NiSO$_4$.6H$_2$O, 300 / NiCl$_2$.6H$_2$O, 45 | Phosphorous Acid, 6.6 | | do | 41 | 2.0 | 3.52 |
| 32c | NiSO$_4$.6H$_2$O, 300 / NiCl$_2$.6H$_2$O, 45 | Phosphorous Acid, 10.2 | | do | 41 | 1.5 | 9.2 |

*Ni sulfamate.

The following Table I sets forth examples of triplex composites of the present invention prepared using the baths set forth in Tables A, B, and C:

Where the composite has more than three layers of nickel, the phosphorus-containing nickel layer is always bonded to layers of nickel on both sides. Moreover, at

TABLE I

| Ex. No. | Basis Metal | Lower Layer<br>Bath from Table A Amps./ft.$^2$ and Temp., °F. Thickness, mils | Intermediate Layer<br>Bath from Table C Amps./ft.$^2$ and Temp., °F. Thickness, mils | Upper Layer<br>Bath from Table B Amps./ft.$^2$ and Temp., °F. Thickness, mils | Remarks |
|---|---|---|---|---|---|
| I | Steel | (2a)<br>40 asf., 130°<br>0.6 mil | Not used | (4b)<br>50 asf., 150°<br>0.5 mil | Comparative Duplex System. |
| II | Zn+.3 mil of bright copper. | (2a)<br>40 asf., 130°<br>0.6 mil | do | (4b)<br>50 asf. 150°<br>0.5 mil | Do. |
| III | do | (2a)<br>40 asf., 130°<br>0.6 mil | (2c)<br>40 asf., 145° F<br>0.1 mil | (4b)<br>50 asf., 150°<br>0.5 mil | |
| IV | Steel | (2a)<br>40 asf., 130°<br>0.6 mil | (2c)<br>40 asf., 145° F<br>0.1 mil | (4b)<br>50 asf., 150°<br>0.5 mil | |
| V | do | (2a)<br>40 asf., 130°<br>0.6 mil | (13c)<br>40 asf., 145° F<br>0.05 mil | (4b)<br>50 asf., 150°<br>0.5 mil | |
| VI | do | (5a)<br>50 asf., 140° F<br>0.6 mil | (1c)<br>40 asf., 140° F<br>0.1 mil | (2b)<br>60 asf., 150°<br>0.1 mil | |
| VII | do | (1a)<br>40 asf., 140°<br>0.6 mil | Not used | (6b)<br>70 asf., 140° F<br>0.5 mil | |
| VIII | do | (1a)<br>40 asf., 140°<br>0.6 mil | (11c)<br>No current, 200° F<br>Ca. 0.1 mil in 6 min | (1b)<br>40 asf., 130° F<br>0.5 mil | |
| IX | do | (7a)<br>100 asf., 130° F<br>0.6 mil | (3c)<br>20 asf., 140° F<br>0.1 mil | (7b)<br>5.0 asf., 135° F<br>0.5 mil | |
| X | do | (6a)<br>40 asf., 130° F<br>0.6 mil | (13c)<br>40 asf., 140° F<br>0.1 mil | (4b)<br>50 asf., 150°<br>0.5 mil | |
| XI | do | (2a)<br>40 asf<br>0.50 mil | (1c)<br>40 asf., 145°<br>0.10 mil | (4b)<br>50 asf<br>0.52 mil | |
| XII | do | Same as XI<br>Same as XI<br>0.48 mil | Same as XI<br>0.12 mil | Same as XI<br>0.48 mil | |
| XIII | do | Same as XI<br>Same as XI<br>0.6 mil | (29c)<br>40 asf., 145°<br>0.1 mil | Same as XI<br>0.5 mil | |
| XIV | do | Same as XI<br>Same as XI<br>0.6 mil | Same as XIII<br>Same as XIII<br>0.1 mil | Same as XI<br>Same as XI<br>0.5 mil | |
| XV | do | Same as XI<br>Same as XI<br>0.6 mil | Same as XIII<br>Same as XIII<br>0.3 mil | Same as XI<br>Same as XI<br>0.5 mil | |
| XVI | do | Same as XI<br>Same as XI<br>0.6 mil | (28c)<br>40 asf., 185°<br>0.1 mil | Same as XI<br>Same as XI<br>0.5 mil | |
| XVII | do | Same as XI<br>Same as XI<br>0.6 mil | Same as XVI<br>Same as XVI<br>0.1 mil | Same as XI<br>Same as XI<br>0.5 mil | |
| XVIII | do | Same as XI<br>Same as XI<br>0.6 mie | Same as XVI<br>Same as XVI<br>0.1 mil | Same as XI<br>Same as XI<br>0.5 mil | |
| XIX | do | Same as XI<br>Same as XI<br>0.49 mil | (10c)<br>40 asf., 140°<br>0.13 mil | Same as XI<br>Same as XI<br>0.48 mil | |
| XX | do | Same as XI<br>Same as XI<br>0.45 mil | Same as XIX<br>Same as XIX<br>0.12 mil | Same as XIX<br>Same as XIX<br>0.51 mil | |
| XXI | do | Same as XI<br>Same as XI<br>0.48 mil | Same as XIX<br>Same as XIX<br>0.12 mil | Same as XI<br>Same as XI<br>0.48 mil | |
| XXII | do | Same as XI<br>Same as XI<br>0.49 mil | Same as XIX<br>Same as sXIX<br>0.11 mil | Same as XI<br>Same as XI<br>0.52 mil | |
| XXIII | do | Same as XI<br>Same as XI<br>0.50 mil | (27c)<br>40 asf., 140°<br>0.20 mil | Same as XI<br>Same as XI<br>0.50 mil | |
| XXIV | do | Same as XI<br>Same as XI<br>0.48 mil | Same as XXIII<br>Same as XXIII<br>0.20 mil | Same as XI<br>Same as XI<br>0.50 mil | |
| XXV | do | Same as XI<br>Same as XI<br>0.49 mil | Same as XXIII<br>Same as XXIII<br>0.20 mil | Same as XI<br>Same as XI<br>0.50 mil | |
| XXVI | do | Same as XI<br>Same as XI<br>0.47 mil | (11c)<br>No current, 200°<br>Ca. 0.1 mil in 6 min (0.18 mil) | Same as XI<br>Same as XI<br>0.45 mil | |
| XXVII | do | Same as XI<br>Same as XI<br>0.53 mil | Same as XXVI<br>Same as XXVI<br>0.12 mil | Same as XI<br>Same as XI<br>0.45 mil | |
| XXVIII | do | Same as XI<br>Same as XI<br>0.53 mil | Same as XXVI<br>Same as XXVI<br>0.10 mil | Same as XI<br>Same as XI<br>0.47 mil | |
| XXIX | do | Same as XI<br>Same as XI<br>0.48 mil | Same as XXVI<br>Same as XXVI<br>0.12 mil | Same as XI<br>Same as XI<br>0.45 mil | |

The present invention in its broadest form includes composites or laminates of nickel layers having more than three layers of nickel and composites or laminates wherein the phosphorus-containing nickel layer is sandwiched between layers of nickel which may have relative potentials equal substantially to each other. least one of the nickel layers should be cathodic to the phosphorus-containing layer and be free from phosphorus substantially.

Examples of systems for the composites of the present invention include composites having, in addition to those already described, (1) a sulfur-free lower layer and a sulfur-free upper layer (2) a bright lower layer and a bright upper layer and (3) a sulfur-containing lower layer and a sulfur-containing upper layer. Thus it is easily understood that composites may be made according to the present invention where the lower layer contains from 0 to about 0.15 percent sulfur and the upper layer contains from 0 to about 0.3 percent sulfur. Higher amounts of sulfur can be obtained in the nickel deposits but there is no advantage in using the higher amounts (>1.0 percent) of sulfur.

While specific examples of the invention have been set forth hereinabove, it is not intended that the invention be limited solely thereto, but to include all of the variations and modifications falling within the scope of the appended claims.

What is claimed is:

1. As an article of manufacture a metal substrate and a laminate bonded to said metal substrate comprising three firmly bonded layers of nickel including an intermediate layer of a nickel-phosphorus alloy sandwiched between and in adherent contact with a phosphorus-free lower layer of nickel and a phosphorus-free upper layer of nickel said intermediate layer comprising from about 0.4% to about 10.0% by weight phosphorus.

2. The article of claim 1 wherein said intermediate layer comprises from about 0.6 percent to about 6 percent phosphorus by weight.

3. As an article of manufacture a metal substrate and a laminate bonded to said metal substrate comprising three firmly bonded layers of nickel including an intermediate layer of a nickel phosphorus alloy sandwiched between and in adherent contact with a relatively noble nickel-containing lower layer and a top layer of bright nickel anodic to said lower layer, said intermediate layer comprising from about 0.4 percent to about 10.0 percent by weight phosphorus and being anodic to said lower layer and said top layer.

4. As an article of manufacture a metal substrate and a composite coating bonded to said metal substrate which is susceptible to atmospheric corrosion, said composite coating comprising as its essential layers three adjacently bonded layers of electrodeposits, the lower layer of which consists essentially of nickel having from 0 to about 25 percent cobalt by weight therewith and an average sulfur content of less than 0.15 percent by weight based on the weight of said electrodeposit, a top layer of which consists essentially of bright nickel having from 0 to about 50 percent cobalt alloyed therewith and from about 0.03 percent to about 0.3 percent sulfur by weight and the intermediate layer of which comprises nickel having from 0 to 25 percent cobalt alloyed therewith and containing from about 0.6 percent to about 6 percent phosphorus based on the total weight of said intermediate layer.

5. The article of claim 4 wherein said lower layer has a thickness of from about 0.3 mil to about 2 mils, said top layer has a thickness from about 0.15 mil to about 1 mil and said intermediate layer has a thickness ranging from about 0.01 mil to about 0.2 mil.

6. The article of claim 5 wherein said top layer of nickel has a layer of chromium thereover having a thickness ranging from about 0.005 to about 0.2 mil.

7. The article of claim 4 wherein said top layer of nickel has a layer of chromium thereover having a thickness ranging from about 0.005 to about 0.2 mil.

8. As an article of manufacture a metal substrate and a composite coating bonded to said metal substrate, said composite coating comprising as its essential layers three adjacently bonded layers of nickel, the lower layer of which consists essentially of nickel having a sulfur content of less than 0.15 percent selected from the group consisting of nickel and a nickel-cobalt alloy containing less than about 25 percent cobalt based on the weight of said lower layer, the upper layer of which consists essentially of nickel having a sulfur content of from about 0.03 percent to about 0.4 percent, selected from the group consisting of nickel and a nickel-cobalt alloy containing less than about 50 percent cobalt based on the weight of said upper layer and the intermediate layer of which consists essentially of a nickel alloy selected from the group consisting of a nickel-phosphorus alloy having from about 0.4 percent to about 10 percent phosphorus and a nickel-cobalt-phosphorus alloy having from about 0.4 percent to about 10 percent phosphorus and containing less than 25 percent cobalt.

9. As an article of manufacture a metal substrate and a composite coating bonded to said metal substrate which is of the group consisting of iron, steel, copper, and alloys thereof and zinc, aluminum and magnesium and alloys thereof having a copper strike thereon, said coating comprising as its essential layers three adjacently bonded layers, the lower layer of which consists essentially of nickel having from 0 to about 25 percent cobalt by weight alloyed therewith and an average sulfur content of less than 0.15 percent by weight based on the weight of said layer, a top layer of which consists essentially of bright nickel having from 0 to about 50 percent cobalt alloyed therewith and from about 0.03 percent to about 0.4 percent sulfur by weight and the intermediate layer of which comprises nickel having from 0 to 25 percent cobalt alloyed therewith and containing from about 0.4 percent to about 10 percent phosphorus based on the total weight of said intermediate layer.

10. The article of claim 9 wherein said top layer contains from 0 to about 25 percent by weight cobalt.

11. The article of claim 7 wherein said top layer of nickel has a layer of chromium thereover having a thickness ranging from about 0.005 to about 0.2 mil.

12. In a method of electroplating from aqueous solutions a corrosion-protective composite nickel coating comprising as its essential layers three adjacently bonded layers of electrodeposits on a metal surface susceptible to atmospheric corrosion wherein a lower layer is cathodic to an intermediate layer and an upper layer and said intermediate layer is anodic to said lower layer and said upper layer, the improvement comprising electrodepositing said intermediate layer from an aqueous solution of salts and free acids capable of permitting codeposition of phosphorus with the nickel to form a layer of nickel having a thickness of from about 0.01 to 0.2 mil and a phosphorus content of from about 0.4 percent to about 10 percent by weight of the intermediate layer.

13. The method of claim 12 wherein said lower layer is deposited from an aqueous solution comprising nickel salts and at least one sulfur compound to provide a layer consisting essentially of nickel electroplate having from 0 to about 25 percent cobalt by weight alloyed therewith and an average sulfur content up to about 0.15 percent by weight, and wherein said top layer is deposited from an aqueous solution comprising nickel salts and sulfur to provide a bright nickel electroplate having from about 0.03 percent to about 0.3 percent sulfur by weight and the intermediate layer of which comprises a deposit of nickel containing from about 0.6 percent to about 6 percent phosphorus based on the total weight of said intermediate layer.

14. The method of claim 12 wherein said intermediate nickel layer is plated from an aqueous acidic bath containing from about 0.5 gram per liter to about 15 grams per liter of a compound having the formula

wherein $n$ is an integer having a value of 0-1, $m$ is an integer having a value of 0-1, and R represents a radical selected from the class consisting of hydrogen, alkali metal, nickel, cobalt, alkyl, aralkyl, aryl and alkaryl.

15. The method of claim 14 wherein said compound is phosphorus acid.

16. The method of claim 14 wherein said compound is an alkali metal phosphite.

17. The method of claim 14 wherein said intermediate layer is plated from an aqueous nickel plating bath containing from about 1.0 gram per liter to about 8 grams per liter of a compound having the formula

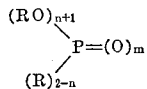

wherein $n$ is an integer having a value of 0–1, $m$ is an integer having a value of 0–1, and R represents a radical selected from the class consisting of hydrogen, alkali metal, nickel, cobalt, alkyl, aralkyl, aryl and alkaryl.

18. A method of electroplating from an aqueous solution a corrosion protective composite coating on a metal surface susceptible to atmospheric corrosion which comprises the steps of (1) electroplating on said surface in at least one electroplating step an adherent layer consisting essentially of nickel having a thickness of about 0.3 mil to about 2 mils and sulfur content of less than about 0.15 percent, to thus form an adherent lower layer, (2) depositing directly on said lower layer in at least one plating step an adherent intermediate layer consisting essentially of a plate selected from the group consisting of nickel plate and nickel-cobalt alloy plate containing at least about 75 percent nickel, said intermediate layer having a thickness of about 0.01 mil to about 0.2 mil and an average phosphorus content of about 0.4 percent to about 10 percent, (3) electroplating directly on said intermediate nickel layer an adherent upper layer in at least one electroplating step consisting essentially of an electroplate selected from the group consisting of nickel electroplate and nickel-cobalt alloy electroplate containing at least about 50 percent nickel, said upper layer having a thickness of about 0.15 to about 1 mil and an average sulfur content of 0.03 to 0.3 percent, said upper nickel layer containing a lower percentage of sulfur than said intermediate nickel layer, and a higher percentage of sulfur than said lower layer, said top layer being plated from an aqueous nickel bath containing from about 0.004 to about 1 gram per liter of a bath soluble sulfur compound.

19. A composite coating bonded to a metal substrate, said composite coating comprising at least 3 layers of nickel adjacently bonded together including a lower layer, an upper layer and an intermediate layer, said intermediate layer comprising a deposition of nickel-phosphorus alloy having therein about 0.4% to about 10.0% by weight phosphorus and being at least 60 millivolts more electronegative than said lower layer.

References Cited

UNITED STATES PATENTS

| | | | |
|---|---|---|---|
| 2,643,221 | 6/1953 | Brenner et al. | 204—43 |
| 2,644,787 | 7/1953 | Bonn et al. | 204—43 |
| 2,871,550 | 2/1959 | Weinberg et al. | 204—41 X |
| 3,090,733 | 5/1963 | Brown | 204—40 |
| 3,183,067 | 5/1965 | DuRose et al. | 204—40 X |

FOREIGN PATENTS 630,348    3/1963    Belgium.

HOWARD S. WILLIAMS, *Primary Examiner.*

JOHN H. MACK, G. KAPLAN, *Assistant Examiners.*